United States Patent
Lee

(10) Patent No.: US 12,506,329 B2
(45) Date of Patent: Dec. 23, 2025

(54) DISTRIBUTION BOARD BUS BAR MODULE HAVING LEAKAGE CURRENT LIMITING FUNCTION

(71) Applicant: VISION TECH Corporation, Busan (KR)

(72) Inventor: Ho Seok Lee, Busan (KR)

(73) Assignee: VISION TECH Corporation, Busan (KR)

( * ) Notice: Subject to any disclaimer, the term of this patent is extended or adjusted under 35 U.S.C. 154(b) by 114 days.

(21) Appl. No.: 18/224,540

(22) Filed: Jul. 20, 2023

(65) Prior Publication Data
US 2024/0305072 A1    Sep. 12, 2024

(30) Foreign Application Priority Data

Mar. 7, 2023    (KR) .................. 10-2023-0029601

(51) Int. Cl.
*H02B 1/20*     (2006.01)
*H02B 1/056*    (2006.01)
*H02B 1/06*     (2006.01)

(52) U.S. Cl.
CPC .............. *H02B 1/20* (2013.01); *H02B 1/056* (2013.01); *H02B 1/06* (2013.01)

(58) Field of Classification Search
CPC ............................. H02B 1/207; H05K 9/0098
See application file for complete search history.

(56) References Cited

U.S. PATENT DOCUMENTS

| | | | | |
|---|---|---|---|---|
| 12,009,643 | B2 * | 6/2024 | Park | H02B 1/207 |
| 2024/0275097 | A1 * | 8/2024 | Lee | H01R 13/10 |
| 2024/0290564 | A1 * | 8/2024 | Lee | H01H 71/025 |
| 2024/0291269 | A1 * | 8/2024 | Lee | H02B 1/015 |

FOREIGN PATENT DOCUMENTS

| | | | | | |
|---|---|---|---|---|---|
| KR | 20080030417 | A | * | 4/2008 | ............ H02B 1/207 |
| KR | 100874388 | B1 | * | 12/2008 | ............ H02B 1/041 |
| KR | 101281700 | B1 | * | 7/2013 | ............ H02G 5/007 |
| KR | 20130005426 | U | * | 9/2013 | ............ H02B 1/14 |
| KR | 10-1548621 | B1 | | 9/2015 | |
| KR | 10-1625493 | B1 | | 5/2016 | |
| KR | 10-1984479 | B1 | | 5/2019 | |
| KR | 10-2216183 | B1 | | 2/2021 | |
| KR | 10-2270589 | B1 | | 6/2021 | |
| KR | 102580337 | B1 | * | 9/2023 | ............ H02B 1/207 |
| KR | 102595685 | B1 | * | 10/2023 | ............ H02B 1/207 |

OTHER PUBLICATIONS

Non-final Office Action dated June 24, 2024 from the Korean Patent Office for Application No. 10-2023-0029601 and its English translation.

Notice of Allowance dated Feb. 20, 2025 from the Korean Patent Office for Application No. 10-2023-0029601 and its English translation.

* cited by examiner

*Primary Examiner* — Robert J Hoffberg

(74) *Attorney, Agent, or Firm* — Insight Law Group, PLLC; Seung Lee

(57) ABSTRACT

The present disclosure relates to a distribution board bus bar module having a leakage current limiting function, in which a current leaking from a bus bar module used in a distribution board may be limited by expanding an area of a bus bar connected to a neutral line among bus bars of the bus bar module used in the distribution board, and thus the risk of electric shock to the human body due to a leakage current can be minimized.

4 Claims, 3 Drawing Sheets

DISTRIBUTION BOARD BUS BAR MODULE HAVING LEAKAGE CURRENT LIMITING FUNCTION

CROSS-REFERENCE TO RELATED APPLICATION

This application claims priority to and the benefit of Korean Patent Application No. 10-2023-0029601 filed on Mar. 7, 2023, the disclosure of which is incorporated herein by reference in its entirety.

BACKGROUND

1. Field of the Invention

The present disclosure relates to a bus bar module, and more particularly, to a distribution board bus bar module having a leakage current limiting function.

2. Discussion of Related Art

In general, when a small voltage is applied, an electrical wire is used. However, in the case of a transformer, a circuit breaker, or the like to which a high voltage is applied, since a current should flow stably and resistance is characterized to be inversely proportional to a cross-section area, a bus bar having a large cross-sectional area is used.

Korean Patent Registration No. 10-1625493 (published on May 30, 2016) previously filed and registered by the applicant of the present disclosure discloses that a leakage current decreases as an area ratio difference between two flat conductors increases. This technology prevents electric shock by limiting the leakage current by using an area difference between conductor electrodes.

The present inventor has studied a technology capable of limiting a current leaking from a bus bar module used in a distribution board by expanding an area of a bus bar connected to a neutral line among bus bars of the bus bar module used in the distribution board.

RELATED ART DOCUMENT

Patent Document

Korean Patent Registration No. 10-1625493 (published on May 30, 2016)

SUMMARY OF THE INVENTION

The present disclosure is directed to providing a distribution board bus bar module having a leakage current limiting function, in which a current leaking from a bus bar module used in a distribution board may be limited by expanding an area of a bus bar connected to a neutral line among bus bars of the bus bar module used in the distribution board.

A distribution board bus bar module having a leakage current limiting function includes a main bus bar made of a conductive material, which is connected to an output side of a main circuit breaker that blocks power distributed from a three-phase four-wire cable of a three-phase power system and includes a first-phase main bus bar, a second-phase main bus bar, a third-phase main bus bar, and a neutral main bus bar respectively connected to an output terminal of a first-phase voltage line (R line), an output terminal of a second-phase voltage line (S line), an output terminal of a third-phase voltage line (T line), and an output terminal of a neutral line (N line) of the main circuit breaker, a plurality of sub-bus bars made of a conductive material, which are connected between the main bus bar and input sides of a plurality of sub-circuit breakers that block power distributed to terminal loads and include a first-phase sub-bus bar connected between the first-phase main bus bar and an input terminal of a first-phase voltage line (R line) of each sub-circuit breaker, a second-phase sub-bus bar connected between the second-phase main bus bar and an input terminal of a second-phase voltage line (S line) of each sub-circuit breaker, a third-phase sub-bus bar connected between the third-phase main bus bar and an input terminal of a third-phase voltage line (T line) of each sub-circuit breaker, and a neutral sub-bus bar connected between the neutral main bus bar and an input terminal of a neutral line (N line) of each sub-circuit breaker, and a neutral main bus bar area expansion unit that is in electrical contact with the neutral main bus bar of the main bus bar to expand an area of the neutral main bus bar so as to limit a leakage current.

The neutral main bus bar area expansion unit may include an upper area expansion unit made of a conductive material, in which a contact part in contact with an upper surface of the neutral main bus bar protrudes downward to an inner side to primarily expand the area of the neutral main bus bar, and a lower area expansion unit made of a conductive material, in which an upper portion thereof and a lower portion of the upper area expansion unit are coupled in contact with each other to additionally expand the area of the neutral main bus bar.

First main bus bar passage grooves, which are cut so that both ends of the first-phase main bus bar, both ends of the second-phase main bus bar, both ends of the third-phase main bus bar, and both ends of the neutral main bus bar are exposed, may be formed in the front and rear surfaces of the upper area expansion unit.

First sub-bus bar passage grooves, which are cut so that one ends of the first-phase sub-bus bar, the second-phase sub-bus bar, the third-phase sub-bus bar, and the neutral sub-bus bar are exposed, are formed in at least one side surface of the upper area expansion unit.

The distribution board bus bar module may further include a lower housing made of an insulating material, in which the neutral main bus bar area expansion unit is accommodated, and an upper housing made of an insulating material, which is coupled to an upper portion of the lower housing and hides the neutral main bus bar area expansion unit so that the neutral main bus bar area expansion unit is not exposed to the outside.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
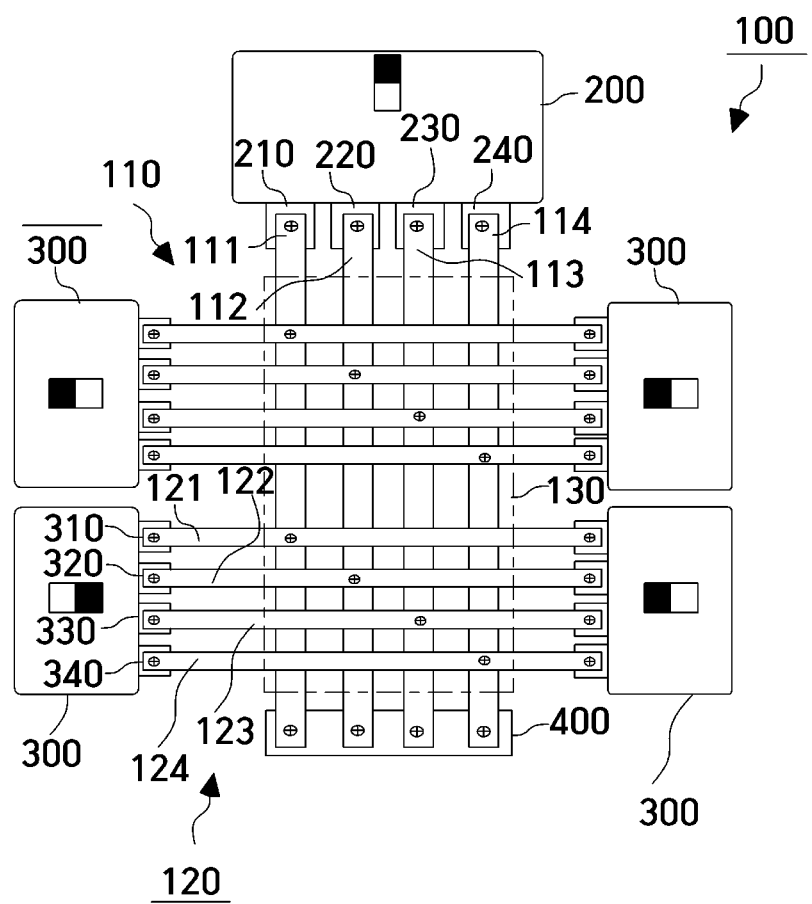
FIG. 1 is a view illustrating a state in which bus bars of a distribution board bus bar module having a leakage current limiting function according to the present disclosure are connected.

Hereinafter, the present disclosure will be described in detail so that those skilled in the art may easily understand and reproduce the present disclosure through exemplary embodiments described with reference to the accompanying drawings. Although specific embodiments are illustrated in the drawings and related detailed descriptions are made, the embodiments and descriptions are not intended to limit various embodiments of the present disclosure to any particular form.

In the description of the present disclosure, when it is determined that the detailed description of related widely known functions or configurations may make the subject matter of the embodiments of the present disclosure unclear, the detailed description will be omitted.

It should be understood that, when it is mentioned that a first component is "connected" or "coupled" to a second component, the first component may be directly connected or coupled to the second component, or a third component may be present between the first component and the second component.

On the other hand, it should be understood that, when a first component is "directly connected" or "directly coupled" to a second component, a third component is not present therebetween.

Figure 2:
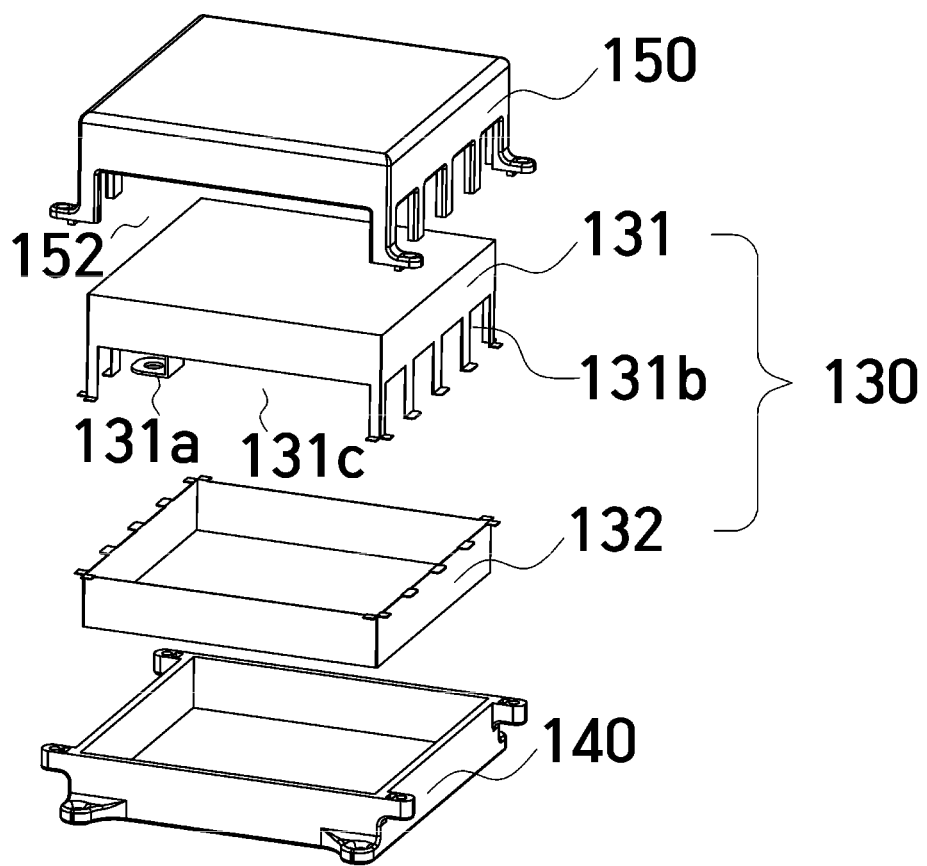
FIG. 2 is an exploded perspective view illustrating a configuration of a neutral main bus bar area expansion unit of the distribution board bus bar module having a leakage current limiting function according to an embodiment of the present disclosure.
Figure 3:
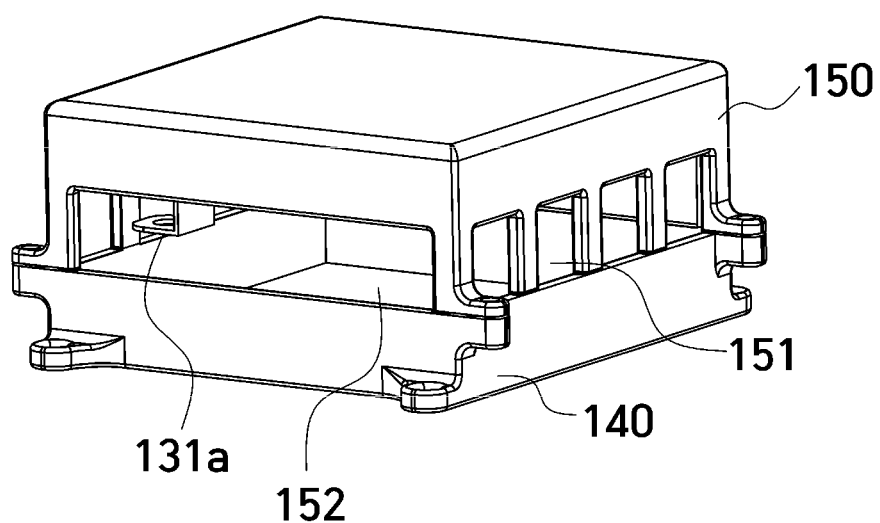
FIG. 3 is a perspective view illustrating a state in which the neutral main bus bar area expansion unit is mounted inside a housing of the distribution board bus bar module having a leakage current limiting function according to the present disclosure.

FIG. 1 is a view illustrating a state in which bus bars of a distribution board bus bar module having a leakage current limiting function according to the present disclosure are connected, FIG. 2 is an exploded perspective view illustrating a configuration of a neutral main bus bar area expansion unit of the distribution board bus bar module having a leakage current limiting function according to an embodiment of the present disclosure, and FIG. 3 is a perspective view illustrating a state in which the neutral main bus bar area expansion unit is mounted inside a housing of the distribution board bus bar module having a leakage current limiting function according to the present disclosure.

As illustrated in FIGS. 1 to 3, a distribution board bus bar module 100 having a leakage current limiting function according to an embodiment includes a main bus bar 110 made of a conductive material, a plurality of sub-bus bars 120 made of a conductive material, and a neutral main bus bar area expansion unit 130.

The main bus bar 110 made of a conductive material is connected to an output side of a main circuit breaker 200 that blocks power distributed from a three-phase four-wire cable (not illustrated) of a three-phase power system and includes a first-phase main bus bar 111, a second-phase main bus bar 112, a third-phase main bus bar 113, and a neutral main bus bar 114.

The first-phase main bus bar 111 is implemented in the form of a metal bar made of a conductive material such as copper and is connected to an output terminal 210 of a first-phase voltage line (R line) of the main circuit breaker 200 that blocks power distributed from the three-phase four-wire cable of the three-phase power system.

The second-phase main bus bar 112 is implemented in the form of a metal bar made of a conductive material such as copper and is connected to an output terminal 220 of a second-phase voltage line (S line) of the main circuit breaker 200 that blocks power distributed from the three-phase four-wire cable of the three-phase power system.

The third-phase main bus bar 113 is implemented in the form of a metal bar made of a conductive material such as copper and is connected to an output terminal 230 of a third-phase voltage line (T line) of the main circuit breaker 200 that blocks power distributed from the three-phase four-wire cable of the three-phase power system.

The neutral main bus bar 114 is implemented in the form of a metal bar made of a conductive material such as copper and is connected to an output terminal 240 of a neutral line (N line) of the main circuit breaker 200 that blocks power distributed from the three-phase four-wire cable of the three-phase power system.

The plurality of sub-bus bars 120 made of a conductive material are connected between the main bus bar 110 and input sides of a plurality of sub-circuit breakers 300 that block power distributed to terminal loads (not illustrated) and include a first-phase sub-bus bar 121, a second-phase sub-bus bar 122, a third-phase sub-bus bar 123, and a neutral sub-bus bar 124.

The first-phase sub-bus bar 121 is implemented in the form of a metal bar made of a conductive material such as copper and is connected between the first-phase main bus bar 111 and an input terminal 310 of a first-phase voltage line (R line) of each sub-circuit breaker 300.

The second-phase sub-bus bar 122 is implemented in the form of a metal bar made of a conductive material such as copper and is connected between the second-phase main bus bar 112 and an input terminal 320 of a second-phase voltage line (S line) of each sub-circuit breaker 300.

The third-phase sub-bus bar 123 is implemented in the form of a metal bar made of a conductive material such as copper and is connected between the third-phase main bus bar 113 and an input terminal 330 of a third-phase voltage line (T line) of each sub-circuit breaker 300.

The neutral sub-bus bar 124 is implemented in the form of a metal bar made of a conductive material such as copper and is connected between the neutral main bus bar 114 and an input terminal 340 of a neutral line (N line) of each sub-circuit breaker 300.

The neutral main bus bar area expansion unit 130 is made of a conductive material such as copper and is in electrical contact with the neutral main bus bar 114 of the main bus bar 110 to expand an area of the neutral main bus bar 114 so as to limit a leakage current. For example, the neutral main bus bar area expansion unit 130 may include an upper area expansion unit 131 made of a conductive material and a lower area expansion unit 132 made of a conductive material.

In the upper area expansion unit 131 made of a conductive material, a contact part 131a in contact with an upper surface of the neutral main bus bar 114 protrudes downward to an inner side to primarily expand the area of the neutral main bus bar 114.

In the lower area expansion unit 132 made of a conductive material, an upper portion thereof and a lower portion of the upper area expansion unit 131 are electrically and mechanically coupled in contact with each other to additionally expand the area of the neutral main bus bar 114.

By the neutral main bus bar area expansion unit 130 made of a conductive material, the area of the neutral main bus bar 114 becomes greater than areas of the first-phase main bus bar 111, the second-phase main bus bar 112, and the third-phase main bus bar 113. Thus, a leakage current becomes much smaller, and as the leakage current becomes smaller, the risk of electric shock becomes smaller, and thus the risk of electric shock to the human body due to the leakage current can be minimized.

The reason for this, as disclosed in Korean Patent Registration No. 10-1625493 (published on May 30, 2016), is that the leakage current gradually decreases as the area of the flat plate-shaped conductor (corresponding to the neutral main bus bar of the present disclosure) connected to a negative terminal becomes greater than the area of a flat plate-shaped conductor (corresponding to the first-phase main bus bar, the second-phase main bus bar, and the third-phase main bus bar of the present disclosure) connected to a positive terminal of a power source.

In detail, a closed loop is not normally configured in a portion where an area is expanded by the neutral main bus bar area expansion unit 130 made of a conductive material, but when the distribution board bus bar module 100 having a leakage current limiting function is submerged in water due to flooding, the closed loop is configured.

In this process, a current leaking through the first-phase main bus bar 111, the second-phase main bus bar 112 or the third-phase main bus bar 113 of the distribution board bus bar module 100 having a leakage current limiting function does not flow to the human body having a relatively very large resistance but flows to the neutral main bus bar area expansion unit 130 through the water and is drawn into the neutral main bus bar 114. Thus, the flow of the leakage current to the human body is limited, and thus the risk of electric shock to the human body is minimized.

By this implementation, according to the present disclosure, the current leaking through the bus bar module used in the distribution board may be limited by expanding the area of the bus bar connected to the neutral line among the bus bars of the bus bar module used in the distribution board. Thus, the risk of electric shock to the human body due to the leakage current can be minimized.

Meanwhile, according to an additional aspect of the present disclosure, first main bus bar passage grooves 131b may be formed in the front and rear surfaces of the upper area expansion unit 131. The first main bus bar passage grooves 131b may be formed by partially cutting the front and rear surfaces of the upper area expansion unit 131 such that both ends of the first-phase main bus bar 111, both ends of the second-phase main bus bar 112, both ends of the third-phase main bus bar 113, and both ends of the neutral main bus bar 114 are exposed.

Meanwhile, the plurality of first main bus bar passage grooves 131b may be formed so that the first-phase main bus bar 111, the second-phase main bus bar 112, the third-phase main bus bar 113, and the neutral main bus bar 114 pass therethrough while being isolated from each other.

One ends of the first-phase main bus bar 111, the second-phase main bus bar 112, the third-phase main bus bar 113, and the neutral main bus bar 114 exposed through the first main bus bar passage grooves 131b are electrically and mechanically connected to the output side of the main circuit breaker 200, and the other ends thereof are fixed to a fixture 400 made of an insulating material by a screw coupling method or the like.

Meanwhile, according to an additional aspect of the present disclosure, a first sub-bus bar passage groove 131c may be formed in at least one side surface of the upper area expansion unit 131. The first sub-bus bar passage groove 131c may be formed by partially cutting at least one side surface of the upper area expansion unit 131 such that one ends of the first-phase sub-bus bar 121, the second-phase sub-bus bar 122, the third-phase sub-bus bar 123, and the neutral sub-bus bar 124 are exposed.

One ends of the first-phase sub-bus bar 121, the second-phase sub-bus bar 122, the third-phase sub-bus bar 123, and the neutral sub-bus bar 124 exposed through the first bus-bus bar passage groove 131c are electrically and mechanically connected to the input side of the sub-circuit breaker 300.

Meanwhile, according to an additional aspect of the present disclosure, the distribution board bus bar module 100 having a leakage current limiting function may further include a lower housing 140 made of an insulating material and an upper housing 150 made of an insulating material.

The neutral main bus bar area expansion unit 130 is accommodated inside the lower housing 140 made of an insulating material. The upper housing 150 made of an insulating material is coupled to an upper portion of the lower housing 140 by a screw coupling method or the like and thus hides the neutral main bus bar area expansion unit 130 so that the neutral main bus bar area expansion unit 130 is not exposed to the outside.

Meanwhile, second main bus bar passage grooves 151 corresponding to the first main bus bar passage grooves 131b may be formed in the front and rear surfaces of the upper housing 150. The second main bus bar passage grooves 151 may be formed by partially cutting the front and rear surfaces of the upper housing 150 such that both ends of the first-phase main bus bar 111, both ends of the second-phase main bus bar 112, both ends of the third-phase main bus bar 113, and both ends of the neutral main bus bar 114 are exposed.

Meanwhile, a second sub-bus bar passage groove 152 corresponding to the first sub-bus bar passage groove 131c may be formed in at least one side surface of the upper housing 150. The second sub-bus bar passage groove 152 may be formed by partially cutting at least one side surface of the upper housing 150 such that one ends of the first-phase sub-bus bar 121, the second-phase sub-bus bar 122, the third-phase sub-bus bar 123, and the neutral sub-bus bar 124 are exposed.

By this implementation, in a state in which the neutral main bus bar area expansion unit 130 is accommodated inside the lower housing 140 made of an insulating material, the upper housing 150 made of an insulating material is coupled to the upper portion of the lower housing 140, and thus the neutral main bus bar area expansion unit 130 is hidden without being exposed to the outside.

As described above, according to the present disclosure, the current leaking through the bus bar module used in the distribution board may be limited by expanding the area of the bus bar connected to the neutral line among the bus bars of the bus bar module used in the distribution board. Thus, the risk of electric shock to the human body due to the leakage current can be minimized.

According to the present disclosure, a current leaking through a bus bar module used in a distribution board can be limited by expanding an area of a bus bar connected to a neutral line among bus bars of the bus bar module used in the distribution board. Thus, the risk of electric shock to the human body due to a leakage current can be minimized.

Various embodiments disclosed in the present specification and the drawings are merely presented as specific examples to help understanding and are not intended to limit the scope of various embodiments of the present disclosure.

Thus, it should be interpreted that the scope of various embodiments of the present disclosure includes all changes or modifications derived based on the technical spirit of various embodiments of the present disclosure in addition to the embodiments described herein.

What is claimed is:

1. A distribution board bus bar module having a leakage current limiting function, the distribution board bus bar module comprising:
a main bus bar made of a conductive material, which is connected to an output side of a main circuit breaker that blocks power distributed from a three-phase four-wire cable of a three-phase power system and includes a first-phase main bus bar, a second-phase main bus bar, a third-phase main bus bar, and a neutral main bus bar respectively connected to an output terminal of a first-phase voltage line, an output terminal of a second-phase voltage line, an output terminal of a third-phase voltage line, and an output terminal of a neutral line of the main circuit breaker;
a plurality of sub-bus bars made of a conductive material, which are connected between the main bus bar and input sides of a plurality of sub-circuit breakers that block power distributed to terminal loads and include a first-phase sub-bus bar connected between the first-phase main bus bar and an input terminal of a first-phase voltage line of each sub-circuit breaker, a second-phase sub-bus bar connected between the second-phase main bus bar and an input terminal of a second-phase voltage line of each sub-circuit breaker, a third-phase sub-bus bar connected between the third-phase main bus bar and an input terminal of a third-phase voltage line (T line) of each sub-circuit breaker, and a neutral sub-bus bar connected between the neutral main bus bar and an input terminal of a neutral line of each sub-circuit breaker; and
a neutral main bus bar area expansion unit, the neutral main bus bar area expansion unit includes:
an upper area expansion unit made of a conductive material, the upper area expansion unit includes a contact part that protrudes downward to contact an upper surface of the neutral main bus bar, and
a lower area expansion unit made of a conductive material, an upper portion of the lower area expansion unit and a lower portion of the upper area expansion unit are coupled in contact with each other,
the upper area expansion unit and the lower upper area expansion unit expand the area of the neutral main bus bar so as to limit a leakage current of the distribution board bus bar module, and
the upper area expansion unit and the lower upper area expansion unit surround a portion of the first-phase main bus bar and a portion of the first-phase sub-bus bar where the first-phase main bus bar and the first-phase sub-bus bar are connected, a portion of the second-phase main bus bar and a portion of the second-phase sub-bus bar where the second-phase main bus bar and the second-phase sub-bus bar are connected, a portion of the third-phase main bus bar and a portion of the third-phase sub-bus bar where the third-phase main bus bar and the third-phase sub-bus bar are connected, and a portion of the neutral main bus bar and a portion of the neutral sub-bus bar where the neutral main bus bar and the neutral sub-bus bar are connected.

2. The distribution board bus bar module of claim 1, wherein first main bus bar passage grooves, which are cut so that both ends of the first-phase main bus bar, both ends of the second-phase main bus bar, both ends of the third-phase main bus bar, and both ends of the neutral main bus bar are exposed, are formed in front and rear surfaces of the upper area expansion unit.

3. The distribution board bus bar module of claim 2, wherein first sub-bus bar passage grooves, which are cut so that one ends of the first-phase sub-bus bar, the second-phase sub-bus bar, the third-phase sub-bus bar, and the neutral sub-bus bar are exposed, are formed in at least one side surface of the upper area expansion unit.

4. The distribution board bus bar module of claim 1, further comprising:
a lower housing made of an insulating material, in which the neutral main bus bar area expansion unit is accommodated; and
an upper housing made of an insulating material, which is coupled to an upper portion of the lower housing and hides the neutral main bus bar area expansion unit so that the neutral main bus bar area expansion unit is not exposed to the outside.

* * * * *